3,086,059
4-HALO-2-BUTYNYL SULFIDES AND USE FOR CONTROLLING NEMATODES

Thomas R. Hopkins, Prairie Village, and Joe W. Pullen, Overland Park, Kans., assignors to Spencer Chemical Company, Kansas City, Mo., a corporation of Missouri
No Drawing. Filed Apr. 14, 1960, Ser. No. 22,106
6 Claims. (Cl. 260—609)

This invention relates to compositions and methods for controlling nematodes. More specifically, this invention relates to new 4-halo-2-butynyl sulfides and methods of using them for controlling plant parasitic nematodes.

Nematodes are non-segmented worms, sometimes referred to as eelworms, which are found in all soils in which plants grow, and consequently every major crop is a potential victim of this pest. Some species such as the root-knot nematodes, Meloidogyne spp., citrus nematode, and sugar beet nematode, *Heterodera schachtii*, infest soils in which crops are planted and cause considerable damage to the crop. It has been estimated that the annual damage either directly or indirectly incurred from plant parasitic nematodes is as high as several million dollars. The term "nematode" as used herein is intended to include all forms through which nematodes pass in a life cycle, such as eggs, larvae and adults.

According to the present invention, there are provided new 4-halo-2-butynyl sulfides and nematocidal compositions containing 4-halo-2-butynyl sulfides. There are also provided methods for controlling nematodes by employing 4-halo-2-butynyl sulfides. The 4-halo-2-butynyl sulfides of this invention can be represented by the formula

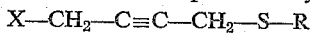

wherein X is a halogen atom, and preferably bromine or chlorine, and R represents an alkyl radical. Examples of suitable alkyl radicals include methyl, ethyl, propyl, isopropyl, n-butyl, isobutyl, pentyl, hexyl, octyl, as well as the cycloalkyl radicals such as cyclopentyl and cyclohexyl and the substituted alkyl groups such as the benzyl and phenylethyl radical. Preferably R is a lower alkyl having 1 to about 8 carbon atoms, straight or branched chain.

It has been found that nematodes are effectively controlled by exposing them to a nematocidal amount of the 4-halo-2-butynyl sulfides of this invention, such as by application of the compounds to soil infested with plant parasitic nematodes. When applied to soil at rates suitable for controlling nematodes, these compounds are not phytotoxic to growing plants. Since the compounds are relatively volatile at normal atmospheric temperatures, they act as fumigants, and are rapidly distributed through the soil permeating soil above, below and adjacent to the site of application, thereby giving a rapid and widespread exposure of the chemical to the nematodes.

The 4-halo-2-butynyl sulfides of this invention can be prepared by the reaction of a 1,4-dihalo-2-butyne with an alkali metal salt, such as potassium or sodium, of the corresponding alkyl mercaptan. The reaction can be illustrated by the equation

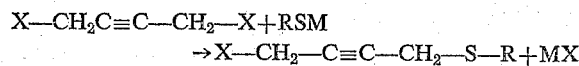

wherein X and R have the significance previously assigned and M is an alkali metal, preferably potassium or sodium.

The reaction is readily effected by bringing the reactants together, preferably in an inert liquid medium, at room temperature or somewhat higher or lower temperatures. At such temperatures the reaction goes to completion in a short time, one to three hours ordinarily being adequate. The solvent used is a matter of choice for those skilled in the art although alcohols such as ethanol, have been found to be especially useful. Essentially equimolar amounts of the reactants or a slight excess of the alkyl mercaptan salt is advisably used. Recovery of the product from the reaction mixture can be effected by conventional methods and the crude product can be purified by distillation under reduced pressure.

The intermediate alkali metal salts of the alkyl mercaptan are readily prepared by reaction of the mercaptan with an alkali metal hydroxide.

Examples of representative 4-halo-2-butynyl sulfides according to the present invention include 4-chloro-2-butynyl methyl sulfide, 4-chloro-2-butynyl ethyl sulfide, 4-bromo-2-butynyl n-butyl sulfide, 4-chloro-2-butynyl n-pentyl sulfide, 4-bromo-2-butynyl cyclohexyl sulfide, 4-bromo-2-butynyl isopropyl sulfide, 4-chloro-2-butynyl benzyl sulfide and 4-chloro-2-butynyl n-octyl sulfide.

The following examples illustrate the preparation of some representative 4-halo-2-butynyl sulfides of this invention, but are not to be considered to limit the scope of invention.

EXAMPLE 1

4-Chloro-2-Butynyl Methyl Sulfide

To a solution of 13.2 grams of 85% potassium hydroxide in 200 ml. of ethanol was added at room temperature 12.0 grams (0.25 mole) of methyl mercaptan. The resulting potassium salt was added dropwise over a 40 minute period to 24.6 grams (0.20 mole) of 1,4-dichloro-2-butyne in 100 ml. of ethanol while maintaining a temperature of 23–25° C. The mixture was then refluxed for 1.5 hours, allowed to cool to room temperature and added to 1.5 liters of water. The resulting mixture was extracted with four 250 ml. portions of diethyl ether, the combined ether extracts dried over calcium sulfate and the ether then removed by distillation. The residue was distilled at reduced pressure and the fraction boiling at 79–88° C./4 mm. was collected as 4-chloro-2-butynyl methyl sulfide; $N_D^{20}$ 1.5340.

EXAMPLE 2

4-Chloro-2-Butynyl Ethyl Sulfide

To a stirred solution of 13.2 grams of 85% potassium hydroxide in 200 ml. of ethanol was added 15.5 grams (0.25 mole) of ethyl mercaptan at about 23° C. over a 10 minute period. This solution was added dropwise to a stirred solution of 24.6 grams (0.20 mole) of 1,4-dichloro-2-butyne in 100 ml. of ethanol at 23–25° C. over a 40 minute period. The mixture was then refluxed for 2 hours and allowed to stand overnight. The mixture was filtered and the filtrate added to 1 liter of water, the aqueous mixture extracted with diethyl ether and the ether extracts dried over anhydrous sodium sulfate. The ether was removed by distillation and the residue distilled under reduced pressure, collecting the fraction boiling at 94–99° C./7–7.5 mm. as 4-chloro-2-butynyl ethyl sulfide; $N_D^{20}$ 1.5270. The product weighed 12.7 grams, corresponding to a 42.8% conversion.

EXAMPLE 3

4-Chloro-2-Butynyl n-Butyl Sulfide

To a stirred solution of 13.2 grams of 85% potassium hydroxide in 200 ml. of ethanol was added dropwise 20.0 grams (0.22 mole) of n-butyl mercaptan at about 25° C. over a 10 minute period. This solution was then added dropwise to a stirred solution of 24.6 grams (0.20 mole) of 1,4-dichloro-2-butyne in 100 ml. of ethanol at about 23–25° C. over a 35 minute period. The mixture was heated at reflux for 1.5 hours and then cooled to room temperature. The cooled mixture was added to 1.5 liter of water, the water solution extracted with four 200 ml.

portions of diethyl ether and the combined ether extracts dried over calcium sulfate. The ether was removed by distillation and the residue distilled under reduced pressure under a nitrogen atmosphere. The fraction boiling at 94–96° C./2–3 mm. was collected as 4-chloro-2-butynyl n-butyl sulfide (15.4 grams); $N_D^{20}$ 1.5103.

The optimum rate of application for the control of plant parasitic nematodes will depend on the type of crop as well as such features as pH of the soil, soil conditions, climatic conditions and the particular type of nematode being treated. It has been found, however, that excellent control of the root knot nematode, without danger of phytotoxicity, is exhibited at a dosage of about 10–100 lbs. per acre. Lower rates are effective if the agent is thoroughly mixed with the soil.

The application of the 4-halo-2-butynyl sulfides to soil is readily achieved by the use of novel concentrates and compositions containing these compounds as the active ingredients. To achieve a suitable dispersion in soil it may be convenient to employ compositions in which the active compound is combined with inert carrier or diluent. The carrier may be a solvent which is miscible with the active agent, or it may be a solvent which is not miscible with the compound where suitable dispersions are also effective. Such compositions may be sprayed on the soil, applied to a trench or injected into the soil.

The active compound may also be absorbed on solid carriers, particularly powders of ether organic or mineral composition. Examples of such solid carriers are pumice, expanded mica, kaolin, clay and pulverized limestone. Dusting is a convenient method of applying such compositions.

Water is useful as a carrier because it is widely available and inexpensive. Since the compounds are essentially immiscible with water, however, there should be included in the composition a surface active agent which will provide a homogeneous mixture from which the nematocidal compound will not settle out rapidly. The surface active agent may be ionic or non-ionic, and may be liquid or a solid. The use of the term "surface active agent" herein is intended to include such compounds commonly referred to as wetting agents, dispersing agents and emulsifying agents. Typical surface active agents which may be used are alkali metal-higher alkylarylsulfonates such as sodium dodecylbenzene sulfonate, fatty alcohol sulfates such as the sodium salts of the monoesters of sulfuric acid with n-aliphatic alcohols containing 8–18 carbon atoms, sodium salts of alkylnaphthalenesulfonic acids, long chain quaternary ammonium compounds, sodium salts of petroleum-derived alkylsulfonic acids, polyethylene sorbitan monooleate, alkylaryl polyether alcohols, water-soluble lignin sulfonate salts, alkalicasein compositions, long chain alcohols usually containing 10 to 18 carbon atoms and condensation products of ethylene oxide with fatty acids, alkyl phenols and mercaptans. These dispersing and wetting agents are sold under numerous trade names and may either be pure compounds, mixtures of compounds of the same general group, or they may be mixtures of compounds of different classes. Surface active agents can also be used in compositions containing a solid inert carrier.

An adjuvant liquid may also be included in such compositions. Such liquids may be either soluble or insoluble in water, and may be any solvent such as an alcohol, benzene, toluene, kerosene or hexane, which aids in solubilizing or dispersing the active nematocidal agent in water.

Concentrated compositions containing the active nematocidal agent which may be subsequently diluted, as with water, to the desired concentration for application to soils are also provided. The advantages of such concentrates are that they are prepared by the manufacturer in a form such that the user need only mix them with a locally available carrier, preferably water, thereby keeping shipping costs to a minimum while providing a product which may be used with a minimum of equipment and effort. Such concentrates may contain about 50% or more of the active nematocidal agent with a carrier or diluent, which may be a solid or liquid. Liquid carriers which are miscible with the active agent or other liquids in which the compound may be suspended may be used. A wetting or surface active agent is also generally included to facilitate such dilution or dispersion in water. However, the wetting agent or surface active agent itself may comprise the carrier in such concentrates.

As hereinbefore stated, the nematocidal compositions of this invention may be applied to soil by injection below the surface of soil, thereby acting as soil fumigants, moving to adjacent areas and killing harmful plant parasitic nematodes. When employed as a fumigant, the 4-halo-2-butynyl sulfides may be applied as the undiluted compound or may be diluted with a liquid carrier. Kerosene is a preferred carrier for application by soil injection. The nematocidal 4-halo-2-butynyl sulfides are readily miscible with kerosene, providing an excellent fumigant composition.

The nematocidal compositions may also be used as a root dip, whereby the roots of nematode-infested plants are dipped briefly in compositions comprising the 4-halo-2-butynyl sulfide and a liquid carrier or diluent.

The following examples illustrate the nematocidal activity of representative compositions of this invention.

EXAMPLE 4

Water suspensions of the test chemicals were prepared in the concentration series of 500, 50 and 5 parts per million. Each concentration was placed in a stoppered test tube. Young adult Panagrellus nematodes were added to each test tube and the contents observed after 24 hours and again after 7 days. The number of live nematodes was observed and the lowest concentration of chemical giving 99+% kill was recorded. The results are recorded in

TABLE I

| Compound | Lowest Effective Concentration (p.p.m.) | |
| --- | --- | --- |
| | At 24 Hrs. | At 7 Days |
| 4-chloro-2-butynyl methyl sulfide | 500 | 50 |
| 4-chloro-2-butynyl ethyl sulfide | 50 | 50 |
| 4-chloro-2-butynyl n-butyl sulfide | 500 | 50 |
| Control (no chemical) | N.S. | N.S. |

N.S.=No significant control.

EXAMPLE 5

The following experiment was made to determine the effectiveness of the 4-chloro-2-butynyl sulfides as dust compositions for controlling nematodes in the presence of soil. The chemicals were mixed with kaolin, slurried with acetone, and the acetone then evaporated to leave a chemical dust. The dust was mixed with root-knot nematode infested soil at application rates of 100, 31 and 10 pounds per acre, and held in sealed jars (three replicates) for seven days at 86° F. The soil was then potted and planted to squash seven days later. The plant roots were examined for galling two months after planting. The percent control was determined by the amount of galling, i.e., no galls-100% control. The results are presented in Table II.

TABLE II

| Compound | Percent Control[a] at Application Rates of— | | |
| --- | --- | --- | --- |
| | 100 lb./a. | 31 lb./a. | 10 lb./a. |
| 4-chloro-2-butynyl methyl sulfide | 100 | 0 | 0 |
| 4-chloro-2-butynyl ethyl sulfide | 100 | 100 | 97 |
| 4-chloro-2-butynyl n-butyl sulfide | 100 | 100 | 80 |

[a] Average of three replicates.

EXAMPLE 6

The following experiment was conducted to evaluate the 4-halo-2-butynyl sulfides as soil fumigants for nematodes.

One-gallon glazed crocks were half-filled with root-knot nematode (Meloidogyne spp.) infested soil. A kerosene solution (2.5 ml.) of each chemical was then pipetted onto the soil surface at the center of the crock. Concentration of the test chemical in kerosene was varied to give application rates of 100, 31, 10 and 3.1 pounds per acre (by volume). Two replicates were used with each concentration. The crocks were then immediately filled with nematode infested soil. After filling, the soil was pressed gently with a flat surface to provide a vapor seal. The crocks were held at a constant temperature (80±1° F.) for three weeks and then transferred to a greenhouse and planted to tomato seedlings.

Eight weeks after planting, the roots were examined for nematode control. Nematode control was determined from the amount of galling. The results are recorded in Table III.

TABLE III

| Compound | Percent Control[a] of Nematodes at rates of— | | | |
|---|---|---|---|---|
| | 100 lb./a. | 31 lb./a. | 10 lb./a. | 3.1 lb./a. |
| 4-chloro-2-butynyl n-butyl sulfide | 99 | 97 | 50 | N.S. |
| 4-chloro-2-butynyl ethyl sulfide | 100 | 99 | 93 | 70 |
| Kerosene Control | N.S. | N.S. | N.S. | N.S. |

N.S.—No significant control.
[a] Mean of two replicates.

Various changes and modifications of the invention can be made and, to the extent that such variations incorporate the spirit of this invention, they are intended to be included within the scope of the appended claims.

We claim:
1. 4-halo-2-butynyl sulfides of the formula

$$X-CH_2-C\equiv C-CH_2-S-R$$

where X is a halogen atom and R is an alkyl radical.
2. 4-halo-2-butynyl lower alkyl sulfides.
3. 4-chloro-2-butynyl methyl sulfide.
4. 4-chloro-2-butynyl ethyl sulfide.
5. 4-chloro-2-butynyl n-butyl sulfide.
6. The process for preparing a 4-halo-2-butynyl sulfide of the formula $$X-CH_2-C\equiv C-CH_2-S-R$$

which comprises reacting a 1,4-dihalo-2-butyne of the formula $$X-CH_2-C\equiv C-CH_2-X$$

with an alkali metal salt of an alkyl mercaptan of the formula $$R-S-M$$

wherein X is a reactive halogen atom, R is an alkyl radical and M is an alkali metal of the group consisting of sodium and potassium.

References Cited in the file of this patent

UNITED STATES PATENTS

| | | |
|---|---|---|
| 2,656,393 | Coe | Oct. 20, 1953 |
| 2,829,172 | Lane | Apr. 1, 1958 |
| 2,945,781 | Santmyer | July 19, 1960 |
| 2,947,660 | Hoffmann | Aug. 2, 1960 |